United States Patent [19]

Nabeshima

[11] Patent Number: 5,475,209

[45] Date of Patent: Dec. 12, 1995

[54] DISPLACEMENT MEASUREMENT APPARATUS HAVING FIRST AND SECOND SERVO CONTROL CIRCUITS AND A ZONE DECISION CIRCUIT

[75] Inventor: Nobuo Nabeshima, Tokyo, Japan

[73] Assignee: Sony Magnescale Inc., Tokyo, Japan

[21] Appl. No.: 318,548

[22] Filed: Oct. 5, 1994

[30] Foreign Application Priority Data

Oct. 5, 1993 [JP] Japan .................................. 5-249467

[51] Int. Cl.⁶ .................................................. G01J 1/20
[52] U.S. Cl. .................................. 250/201.4; 250/201.5; 369/44.35; 369/44.27; 369/44.14
[58] Field of Search ............................ 250/201.3, 201.4, 250/201.5; 369/44.14, 44.35, 44.27, 44.12, 44.19, 44.31, 103, 112; 356/1, 4

[56] References Cited

U.S. PATENT DOCUMENTS

| | | | |
|---|---|---|---|
| 4,542,491 | 9/1985 | Takasago et al. | 369/45 |
| 5,146,442 | 9/1992 | Shikichi | 369/44.27 |
| 5,247,165 | 9/1993 | Hiruta et al. | 250/201.3 |
| 5,396,477 | 3/1995 | Matsumoto et al. | 369/44.31 |

FOREIGN PATENT DOCUMENTS

| | | |
|---|---|---|
| 4219311 | 12/1992 | Germany . |
| 4-366711 | 12/1992 | Japan . |
| 88/02846 | 4/1988 | WIPO . |

Primary Examiner—Edward P. Westin
Assistant Examiner—Que T. Le
Attorney, Agent, or Firm—Foley & Lardner

[57] ABSTRACT

A displacement measurement apparatus utilizing an astigmatism, comprises an objective lens, an optical system detecting an offset distance between a relative distance of the objective lens to a measured surface and its focal distance by utilizing a reflection beam from the measured surface, to generate a focus-error signal, an actuator connected to the lens for moving the objective lens in a direction of an optical axis of the lens on the basis of the focus-error signal, so that the relative distance is maintained at the focal distance, and a linear scale and a detecting head cooperative with each other for detecting a displacement of the linear scale to the head. One of the linear scale and the head is integrally connected to the actuator for moving together with the lens and coaxially aligned with the optical axis, and the other is stationary. A first servo control circuit is arranged for executing a first feedback control based on a linear-scale displacement signal so that the linear-scale displacement signal is adjusted to zero. A second servo control circuit is arranged for executing a second feedback control based on the focus-error signal so that the focus-error signal is adjusted to zero. The first feedback control is executed when a signal level of the focus-error signal is shifted to a dead zone in which the focus-error signal is unuseable as a servo signal necessary for the second feedback control.

6 Claims, 4 Drawing Sheets

DISPLACEMENT MEASUREMENT APPARATUS HAVING FIRST AND SECOND SERVO CONTROL CIRCUITS AND A ZONE DECISION CIRCUIT

BACKGROUND OF THE INVENTION

1. Field of the Invention

The present invention relates to a displacement measurement apparatus which is optimally applied for measuring or detecting a displacement of continuous measured points on a measured surface with respect to a reference plane, and specifically to a measurement apparatus which is capable of a displacement of a measured object by detecting an offset distance between a relative distance of an objective lens to a measured surface and a focal distance of the objective lens, by way of an astigmatism method.

2. Description of the Prior Art

As is generally known, in order to measure or detect a displacement or dimensions of a measured surface or a measured object, a displacement measurement apparatus which utilizes a laser beam and an objective lens, has been used. On such displacement measurement apparatus has been disclosed in Japanese Patent Provisional Publication (Tokkai Heisei) No. 4-366711 corresponding to Japanese Patent Application No. 3-141836, assigned to the same assignee of the present invention. FIG. 5 shows the prior art displacement measurement apparatus disclosed in the Japanese Patent Provisional Publication No. 4-366711. Referring now to FIG. 5, reference numeral 1 denotes a displacement detecting optical system which system detects an offset distance between a relative distance of an objective lens 5 to a measured surface 6 and a focal distance of the objective lens 5, by utilizing a reflection laser beam reflected from the measured surface 6. Reference numeral 16 denotes an actuator which is provided for moving the objective lens 5 in a direction of its optical axis 21 on the basis of an output signal produced by a four-split diode 7 employed in the optical system 1, so that the relative distance between the objective lens 5 and the measured surface 6 is adjusted to the focal distance of the objective lens. Reference numeral 20 denotes a linear scale which is coaxially aligned with an extension line 22 of the optical axis 21 of the objective lens 5. The linear scale 20 is integrally connected to the actuator 16 for motion therewith. The prior art displacement measurement apparatus operates as follows.

First of all, the optical system 1 detects an offset distance between the focal distance of the objective lens 5 and the relative distance of the objective lens 5 to the measured surface 6, by utilizing a reflection laser beam reflected from the measured surface 6. The four-split diode 7 produces an output signal representative of the offset distance. The actuator 16 is responsive to the output signal produced by the four-split diode 7, for moving the objective lens 5 in its optical axis 21 so that the relative distance of the objective lens 5 is adjusted to the focal distance of the objective lens 5. Since the linear scale 20 is integrally connected to the actuator 16 and coaxially aligned with the optical axis 21, the linear scale 20 can be moved by means of the actuator 16 so that a displacement of the linear scale is in correspondence with a displacement of the measured surface 6. In this manner, the displacement of the measured surface 6 can be detected and measured by reading the displacement of the linear scale 20. As is generally known, the four-split diode 7 has a relatively narrow detectable region within which the four-split diode can detect the previously-noted offset distance. The prior art apparatus operates to move the objective lens 5 towards or away from the measured surface 6 at a constant speed when detecting a displacement of the measured surface 6. In case that the constant speed is set at a low speed, there is a possibility that it takes a long time until the objective lens 5 reaches to the detectable region of the four-split diode 7. In case that the constant speed is set at a high speed, there is a possibility that the objective lens 5 overruns the detectable region of the four-split diode 7.

SUMMARY OF THE INVENTION

Accordingly, it is an object of the invention to provide an improved displacement measurement apparatus which avoids the foregoing disadvantages of the prior art.

It is another object of the invention to provide a displacement measurement apparatus which is capable of accurately and quickly detecting a displacement of a measured surface.

It is a further object of the invention to provide a displacement measurement apparatus which has an effective safety function for avoidance of a collision contact between an objective lens and a measured surface.

In order to accomplish the aforementioned and other objects of the invention, a displacement measurement apparatus utilizing an astigmatism, comprises an objective lens focusing a laser beam on a measured surface, an optical system detecting an offset distance between a relative distance of the objective lens to the measured surface and a focal distance of the lens by utilizing a reflection beam reflected from the measured surface, to generate a focus-error signal indicative of the offset distance, an actuator integrally connected to the objective lens for moving the objective lens in a direction of an optical axis of the lens on the basis of the focus-error signal, so that the relative distance is maintained at the focal distance, a linear scale and a detecting head cooperative with each other, for detecting a displacement of the linear scale to the head, one of the linear scale and the head being integrally connected to the actuator for moving together with the lens and coaxially aligned with the optical axis, and the other being stationary, the head generating a linear-scale displacement signal indicative of the displacement of the linear scale, a first servo control circuit arranged for executing a first feedback control based on the linear-scale displacement signal so that the linear-scale displacement signal is adjusted to zero, a second servo control circuit arranged for executing a second feedback control based on the focus-error signal so that the focus-error signal is adjusted to zero, and, a zone decision circuit connected to the first and second servo control circuits, for selecting the first feedback control among the two feedback controls when a signal level of the focus-error signal is shifted to a dead zone in which the focus-error signal is unusable as a servo signal necessary for the second feedback control. The optical system comprises a four-split photo diode consisting of two opposing pairs of light receiving segments, each sensitive to the reflection beam to generate a voltage signal. When receiving the reflection beam, the four-split diode generates a RF signal as well as the focus-error signal. The focus-error signal is defined by the difference between the sum of two voltage signals produced by the one opposing pair of light receiving segments and the sum of two voltage signals produced by the other opposing pair of light receiving segments, while the RF signal is defined by a sum of four voltage signals respectively produced by the two opposing pairs of light receiving segments. In actual, the zone decision circuit determines that the signal level of the focus-error signal is conditioned within the dead zone when the RF signal is less than a predetermined threshold. The zone decision circuit also determines that the signal level of the focus-error signal is conditioned within a focus-error signal dependent servo control permissible zone in which the focus-error signal is usable as the servo signal when the RF signal is above the predetermined threshold. The zone decision circuit selects the second feedback control among the two feedback controls when the signal level of the RF signal is above the predetermined threshold and the signal level of the focus-error signal reaches to zero. The first servo control circuit drivingly controls the actuator at a high speed when the signal level of the focus-error signal is conditioned within the dead zone, for quickly moving the objective lens towards the focused position. On the other hand, the first servo control circuit drivingly controls the actuator at a low speed when the signal level of the focus-error signal is conditioned within the focus-error signal dependent servo control permissible zone, for accurately approaching the objective lens to the focused position and for stopping the lens just at the focused position. The first servo control circuit may be responsive to an external input data as well as to the linear-scale data signal, for externally setting a displacement of the objective lens. In order to avoid collision contact between the objective lens and the measured surface, the zone decision circuit generates an emergency signal to the first servo control circuit for quickly moving the objective lens away from the measured surface when the objective lens lies in proximity to the measured surface and the linear-scale data signal exceeds a predetermined threshold.

DESCRIPTION OF THE PREFERRED EMBODIMENTS

Figure 1:
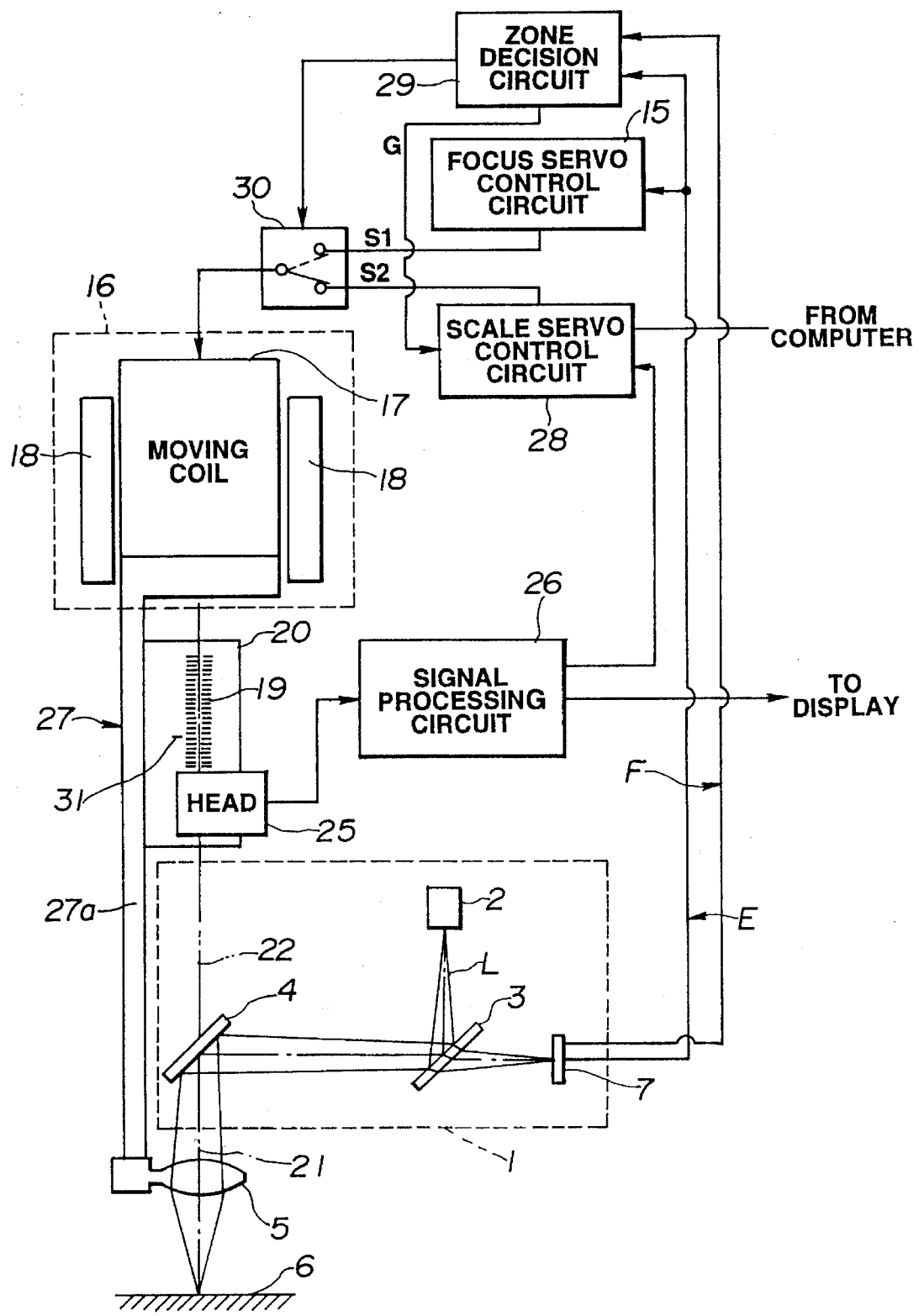
FIG. 1 is a block diagram illustrating one embodiment of a displacement measurement apparatus according to the present invention.

Referring now to the drawings, particularly to FIGS. 1 through 4, there is shown one embodiment of a displacement measurement apparatus of the invention. The same reference numerals used in the prior-art displacement measurement apparatus shown in FIG. 5 will be applied to the corresponding elements used in the embodiment of FIG. 1, for the purpose of comparison between the prior art apparatus and the apparatus of the present embodiment. As seen in FIG. 1, the displacement measurement apparatus of the embodiment includes an optical system 1 for displacement detection, which system is provided for detecting an offset distance between a focal distance f1 of an objective lens 5 and a distance defined between the objective lens 5 and a measured surface 6, and for generating the offset distance as a focus error signal. The optical system includes a laser diode 2 serving as a light source, a beam splitter 3 which receives a laser beam L emitted from the laser diode 2 for reflecting the received laser beam in the left direction (viewing FIG. 1), and a mirror 4 which receives the reflected laser beam from the splitter 3 for further reflecting the laser beam in the downward direction. The reflection laser beam reflected by the mirror 4 enters the objective lens 5 having the focal distance f1. The incident laser beam fed into the objective lens 5 is focused on the measured surface 6.

In the event that the laser beam reflected from the measured surface 6 passes through its return optical path, the reflected laser beam returns from the measured surface 6 back to the objective lens 5, and passes through the objective lens 5 to the mirror 4. The beam reflected from the mirror 4 to the right, enters again into the splitter 3. The beam path going and returning to and from the measured surface 6 is identical between the measured surface 6 and the beam splitter 3. The splitter 3 transmits the laser beam L reflected from the mirror 4 to the right direction (viewing FIG. 1). The transmitted laser beam L is focused on a four-split diode 7 serving as a light detector. In the embodiment, a four-split photo diode is utilized as the light detector. The light detector may be any type of light detector whose current-voltage characteristic is a function of incident light beam.

Figure 2A:
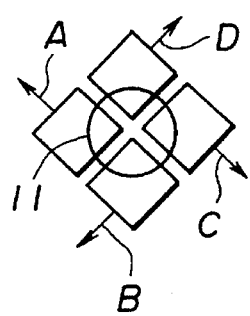
FIGS. 2A, 2B and 2C are explanatory views concerning an operation of a four-split diode employed in the displacement measurement apparatus of the embodiment.
Figure 2B:
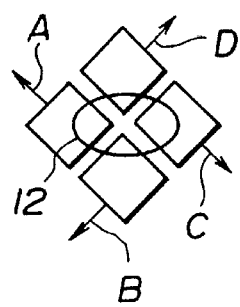
Figure 2C:
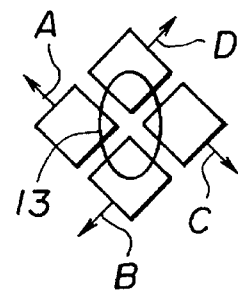

Referring now to FIGS. 2A through 2C, the four-split diode 7 consists of a four split light receiving segments or elements. When the distance between the measured surface 6 and the objective lens 5 coincides with the focal distance f1 of the lens 5, the laser beam L focused on the four-split diode 7 becomes an essentially circular spot 11 as illustrated in FIG. 2A. In case that the objective lens 5 moves away from the measured surface 6 and the distance between the lens 5 and the surface 6 becomes greater than the focal distance f1, the laser beam L focused on the four-split diode 7 becomes a laterally expanded elliptical spot 12 as illustrated in FIG. 2B. In case that the objective lens 5 moves towards the measured surface 6 and the distance between the lens 5 and the surface 6 becomes less than the focal distance f1, the laser beam L focused on the four-split diode 7 becomes a longitudinally expanded elliptical spot 13 as illustrated in FIG. 2C. Each of the four light receiving segments is sensitive to a reflection laser beam reflected from the measured surface 6 and transmitted through the mirror 4 and the beam splitter 3, to generate a laser beam sensitive voltage signal. Thus, assuming that the four split light receiving segments of the diode 7 generate voltage signals A, B, C and D, respectively, the diode 7 thus outputs an output signal E as indicated the following equation.

$$E=(A+C)-(B+D)$$

where the output signal E corresponds to a focus-error detection signal produced by the diode 7. That is, the focus-error signal E is defined by the difference between the sum of the two signals A and C produced by one opposing pair of light receiving segments and the sum of the two signals B and D produced by the other opposing pair of light receiving segments.

Figure 3:
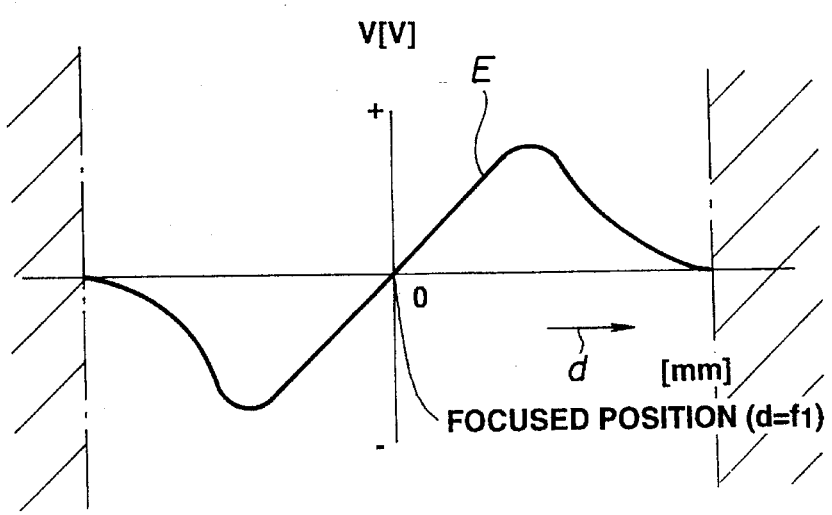
FIG. 3 is a graph illustrating a characteristic of a focus error signal E produced by the four-split diode shown in FIGS. 2A–2C.

FIG. 3 shows an inherent characteristic of the focus-error signal E. In FIG. 3, an axis of abscissa represents the distance d [mm] between the objective lens 5 and the measured surface 6, while an axis of ordinate represents a voltage level [V] of the focus-error signal E. An origin O denotes a focused position at which the distance d becomes identical to the focal distance f1 of the objective lens 5.

In addition, the diode 7 outputs an output signal F as indicated the following equation.

$$F=(A+C)+(B+D)$$

where the output signal F corresponds to a RF (radio frequency) signal produced by the diode 7. The RF signal is defined by the sum of all four signals A, B, C and D respectively produced by the four split light receiving segments.

Figure 4:
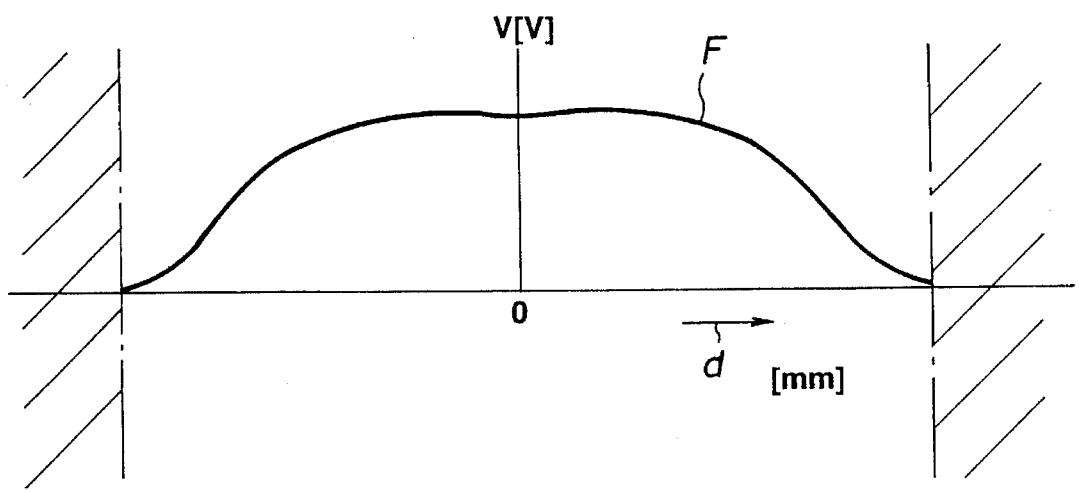
FIG. 4 is a graph illustrating a characteristic of a RF signal F produced by the four-split diode.
Figure 5:
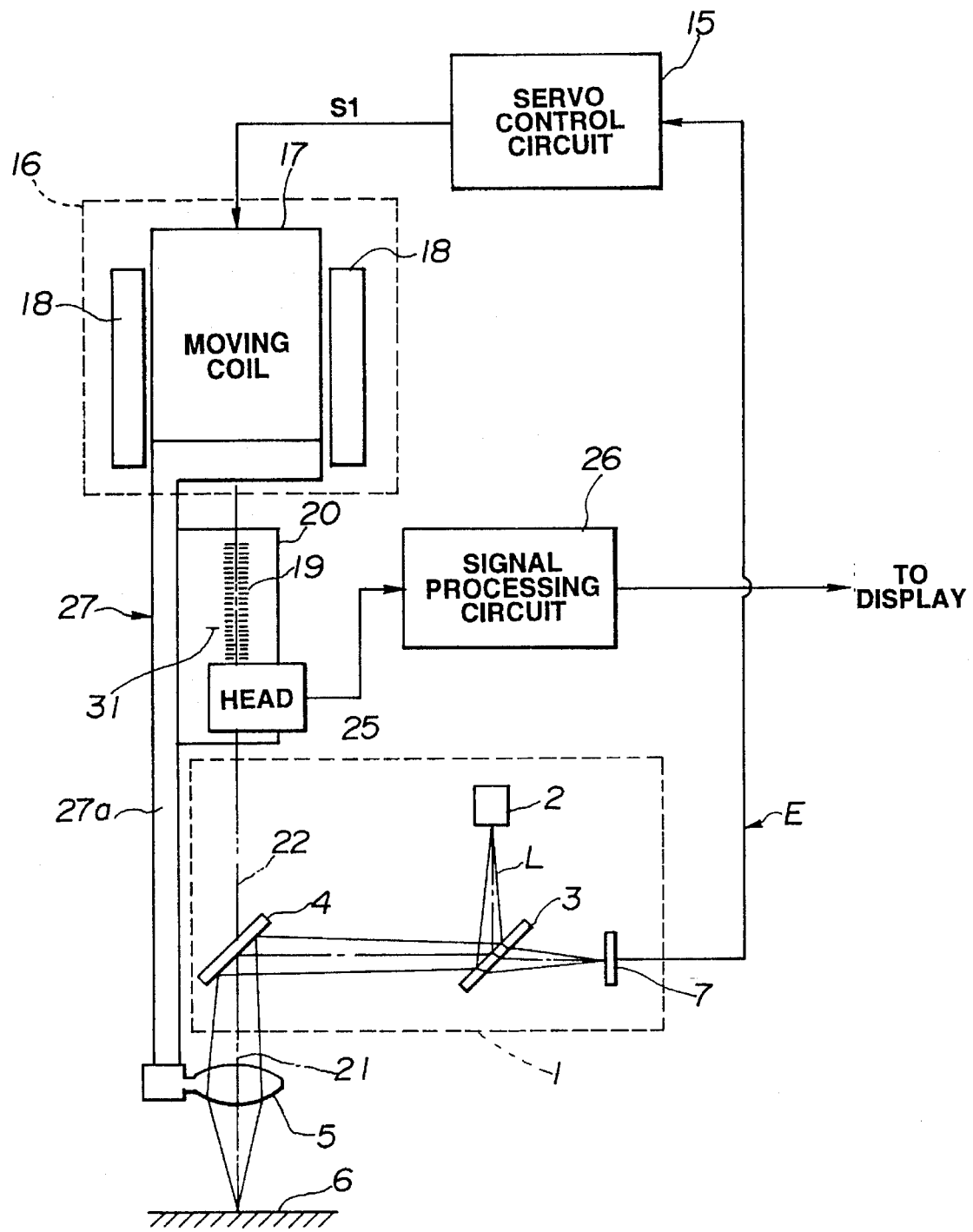
FIG. 5 is a block diagram illustrating a prior art displacement measurement apparatus.

FIG. 4 shows an inherent characteristic of the RF signal F. In FIG. 4, an axis of abscissa represents the distance d [mm] between the objective lens 5 and the measured surface 6, while an axis of ordinate represents a voltage level [V] of the focus-error signal E.

As seen in FIGS. 3 and 4, in the event that, with respect to the focal distance f1 of the objective lens 5, the objective lens 5 is excessively far from the measured surface 6 or excessively close to the measured surface 6, a voltage level of the focus-error signal E is shifted within towards a dead band indicated by a hatched line at both sides of FIG. 3, while a voltage level of the RF signal F is shifted within towards a dead zone (dead band) indicated by a hatched line at both sides of FIG. 4. Within the dead zone, a voltage level of the respective signal E and F is maintained at essentially zero. Since the respective signals E and F remain unchanged within the previously-noted dead zone, a focus-error signal dependent servo control which control will be hereinafter described in detail, cannot be operated with the signals E and F within such a dead zone. In contrast to the above, the respective signals E and F are variable within an intermediate zone defined between the right-hand side dead zone and the left-hand side dead zone indicated in FIGS. 3 and 4. Thus, the focus-error signal dependent servo control can be executed on the basis of the signal E. Within the intermediate zone, the focus-error signal E is usable as a servo signal for the focus servo control. In contrast, the focus-error signal E is unusable as a servo signal within the dead zone. The intermediate zone will be hereinafter referred to as a "focus servo control permissible zone".

Returning to FIG. 1, the displacement measurement apparatus of the embodiment also includes a zone decision circuit 29 which circuit operates to shift a position of a switch 30 under a particular condition. The switch serves as a servo control mode selection switch which selects one of two servo controls as detailed later. Although it is not clearly shown in FIG. 1, the zone decision circuit 29 has a comparator for determining whether the signal level (voltage level) of the RF signal F is less than a predetermined threshold value, by comparing the signal level of the detected signal F with the predetermined threshold, and for switching the contact point of the switch 30 from an output terminal of a focus-error signal dependent servo control circuit 15 as explained later to an output terminal of the linear-scale data dependent servo control circuit 28 as explained later. The previously-noted focus-error signal dependent servo control circuit will be hereinafter abbreviated as a "focus servo control circuit", while the linear-scale data dependent servo control circuit will be hereinafter abbreviated as a "linear servo control circuit". In more detail, at a time point when the signal level of the RF signal F becomes reduced less than the predetermined threshold, the zone decision circuit 29 functions to execute a switching operation of the switch 30 in such a manner as to disconnect the contact point of the switch 30 from the output terminal of the focus servo control circuit 15 and to connect the contact point of the switch 30 to the output terminal of the scale servo control circuit 28. The scale servo control circuit 28 includes an arithmetic circuit and a servo amplifier. The displacement measurement apparatus of the embodiment includes an actuator 16 consisting of a voice coil motor which has a movable coil 17, a permanent magnet 18 and a rod-like connection member 27. The connection member 27 is connected to the bottom of the movable coil 17 at one end. The other end of the connection member 27 firmly supports the objective lens 5. A linear scale 20 is firmly fixed onto a preset position of the rod-like portion 27a of the connection member 27. The linear scale 20 has a scale 19 which is aligned with an extension line 22 of an optical axis 21 of the objective lens 5 and has a series of markings used for reading a relative displacement of the linear scale 20 to a stationary chassis (not shown). In order to detect the relative displacement of the linear scale 20 to the stationary chassis, a detecting head 25 is further provided on the stationary chassis. The linear scale 20 is coaxially aligned with the optical axis 21 of the objective lens 5. Thus, the relative displacement of the linear scale 20 to the stationary chassis is equivalent to an absolute displacement of the objective lens 5. In the preferred embodiment, although the linear scale 20 is fixed to the connection member 27 and in addition the detecting head 25 is mounted on the stationary chassis, alternatively the linear scale 20 may be mounted on the stationary chassis with the head 25 fixed onto the connection member 27 so as to detect the displacement of the objective lens 5. It is preferable that the linear scale 20 is an optical scale utilizing interference fringes and the detecting head 25 is a non-contact type optical detector such as an interferometer. The optical scale may be replaced with a magnetic scale or a capacity type scale. As seen in FIG. 1, the detecting head 25 generates a displacement indicative signal representative of the relative displacement of the linear scale 20 to the stationary chassis. The output terminal of the head 25 is connected to a signal processing circuit 26 to transmit the detected displacement indicative signal thereto. The signal processing circuit 26 derives a displacement data on the basis of the detected displacement indicative signal. The displacement data is supplied from the signal processing circuit 26 to a display (not shown) or to a data logger (not shown), so as to display the detected displacement or to store the derived displacement data.

With the above-noted arrangement, the displacement measurement apparatus of the present invention operates as follows.

For instance, in the event that the objective lens 5 is moved towards the measured surface 6 under a certain condition wherein the objective lens 5 is initialized to be positioned far from the measured surface 6 by a predetermined distance greater than the focal distance f1 of the objective lens 5 and the respective signal levels of the focus-error signal E and the RF signal F are conditioned within the dead zone, the zone decision circuit 29 thus determines that the RF signal F is conditioned within the dead zone. Therefore, the decision circuit 29 operates to connect the input terminal of the switch 30 to the output terminal of the scale servo control circuit 28. The scale servo control circuit 28 successively derives a target displacement of the objective lens 5 on the basis of the displacement data derived by the signal processing circuit 26 and generates a target displacement indicative signal S2 as a drive signal of the moving coil 17 of the actuator 16. By way of a feedback control executed by the scale servo control circuit 28, the objective lens 5 can be quickly moved towards the measured surface 6 at a primary constant moving speed and accurately stopped at a desired position at a secondary constant moving speed such that a displacement of the objective lens 5 is permanently adjusted to the target displacement. The feedback control executed by the scale servo control circuit 28 will be hereinbelow referred to as a "scale servo control". On the other hand, a feedback control executed by the focus servo control circuit 15 will be hereinbelow referred to as a "focus servo control". When the voltage level of the RF signal F is still conditioned within the dead zone at the beginning of the scale servo control, the objective lens 5 can be quickly moved at the primary speed by way of the moving coil 17 which is responsive to the drive signal S2 produced by the scale servo control circuit 28. Thereafter, as soon as the voltage level of the RF signal F has been shifted from the dead zone to the focus servo control permissible zone, the moving coil 17 is responsive to the drive signal S2 to move the objective lens, which lens is connected through the connection member 27 to the moving coil 17, at the secondary speed. Accordingly, at the end of the scale servo control, the objective lens 5 can be more accurately approached and stopped at the desired position with the result that the target displacement of the objective lens 5 is quickly and accurately obtained. The scale servo control circuit 28 is designed to be also responsive to a command signal externally output from a computer (not shown) as well as the displacement data produced by the signal processing circuit 26, such that the scale servo control circuit 28 generates the drive signal S2 based on the command signal output from the computer. In this case, a displacement of the objective lens 5 can be properly determined on the basis of the command signal of the computer and thus the distance d between the objective lens 5 and the measured surface 6 can be maintained at a desired distance based on the external input data produced by the computer. After the target displacement of the objective lens 5 has been obtained through one cycle of the scale servo control, the feedback control is permanently executed in accordance with an updated displacement data derived by the signal processing circuit 26. In this manner, the relative distance d between the objective lens 5 and the measured surface 6 is accurately approached to the focal distance f1 of the objective lens 5. At this time, the comparator constructing the zone decision circuit 29 is responsive to the focus-error signal E as well as the RF signal F, in a manner which detects the focused position (corresponding to the origin O shown in FIG. 3) at which the distance d is completely identical to the focal distance f1 of the objective lens 5. That is, the zone decision circuit 29 determines that the objective lens 5 has been reached to the focused position when two necessary conditions have been satisfied, i.e., when the signal level of the focus-error signal E has been reached to zero and additionally the RF signal F has been conditioned within the focus servo control permissible zone, (above the predetermined threshold). The former necessary condition is based on the focus-error signal E, while the latter necessary condition is based on the RF signal F. In case that the two necessary conditions was satisfied, the focus servo control is performed as follows.

Upon the previously-noted necessary conditions are satisfied, the zone decision circuit 29 performs a switching operation of the switch 30 in a manner so as to shift the contact point of the switch 30 from the output terminal of the scale servo control circuit 28 to the output terminal of the focus servo control circuit 15. Thus, the focus servo control circuit 15 is responsive to the focus-error signal E to output a drive signal S1 to the moving coil 17 so that the focus-error signal E is adjusted to zero in order to more accurately shift the objective lens 5 to its focused position and to precisely compensate the current position of the objective lens 5 which lens would be infinitesimally offset from the focused position O. In this manner, through the focus servo control, the distance d between the objective lens 5 and the measured surface 6 can be more precisely adjusted to the focal distance f1. In this position adjustment of the objective lens 5 based on the focus servo control, the focus servo control circuit generates the drive signal S1 to the moving coil 17 to move the objective lens 5 at a relatively low moving speed corresponding to the secondary speed as previously explained in the scale servo control. As a result of the above-noted arrangement, the objective lens 5 can follow or track infinitesimal changes in a displacement of the measured surface 6. Thus, a displacement of the measured surface 6 can be accurately measured by reading the scale 19 of the linear scale 20 by means of the detecting head 25, while moving the objective lens 5 such that the relative distance d between the objective lens 5 and the measured surface 6 is permanently maintained at the focal distance f1. The displacement data derived by the signal processing circuit 26 may be displayed on a screen of the display (not shown) in a conventional manner. Alternatively, the derived displacement data may be stored in the data logger (not shown). According to the invention, easy automatic measurement is possible. Since the signal processing circuit 26 is integrally incorporated in the displacement measurement apparatus, a displacement to be measured may be measured with a high resolution. In addition, since the scale 19 of the linear scale 20 is coaxially aligned with the optical axis 21 of the objective lens 5, there is no occurrence of Abbe's error owing to a slight inclination of the optical axis 21. As set forth above, the apparatus of the invention can provide a high accuracy of displacement measurement throughout a measurable region on the scale by way of a one to one correspondence between a displacement of the linear scale 20 and a displacement of the objective lens 5.

Since a displacement of the measured surface 6 is measured or detected by utilizing the feedback control explained previously, there is no measurement error even when a sensitivity of the focus-error signal E varies owing to changes in a reflectivity of the measured surface 6 or when there is a slight difference between quality characteristics of components of the actuator 16 or the actuator experiences drift. The apparatus according to the invention does not require a periodic check such as an adjustment or calibration of the apparatus. Therefore, the apparatus of the invention can insure a stable displacement measurement for a long period of time.

In the embodiment, the actuator 16 consisting of a voice coil motor exhibits a superior linearity with regard to positive and negative displacements of the measured surface 6, since the voice coil motor has an inherent characteristic in which the voice coil motor is linearly movable in proportion to a current value of the drive current fed to the motor. As set forth above, although the voice coil motor is used as the actuator in the embodiment, a DC servo motor having the same function of the voice coil motor may be used as the actuator 16.

In the event that the objective lens 5 unpredictively moves closer to the measured surface 6 after reaching to the focused position, the zone decision circuit 29 determines that the signal level of the RF signal F has been shifted from the focus servo control permissible zone to the dead zone, because the signal level of the signal F becomes less than the predetermined threshold. Thus, the zone decision circuit 29 shifts the switch 30 in a manner so as to connect the contact point of the switch 30 to the output terminal of the scale servo control circuit 28. Simultaneously, the zone decision circuit 29 determines on the basis of the linear-scale displacement data derived by the signal processing circuit 26 that the objective lens 5 lies in close proximity to the measured surface 6, when the derived linear-scale displacement data exceeds a predetermined threshold value. At this time, the zone decision circuit 29 outputs an emergency signal G to the scale servo control circuit 28 so as to control a motion of the objective lens 5 by way of an emergency scale servo control. In response to the signal G, the scale servo control circuit 28 executes the emergency scale servo control in such a manner as to moves upwards (viewing FIG. 1) the objective lens 5 away from the measured surface 6. This emergency scale servo control prevents the objective lens 5 from being brought into collision-contact with the measured surface 6.

As will be appreciated from the above, since the linear scale 20 is moved to adjust the relative position of the objective lens 5 to the measured surface 6 until reached to the focus servo control permissible zone and the displacement data of the linear scale 20 (corresponding to the displacement of the objective lens 5, and consequently corresponding to the displacement of the measured point of the measured surface) is used as input information of the feedback control (the scale servo control), the objective lens 5 can be moved at a high speed through the scale servo control in order to assure a quick transition from the dead zone to the focus servo control permissible zone, and thereafter the objective lens 5 can be moved at a low speed through the focus servo control within the focus servo control permissible zone and accurately stopped at a desired position (the focused position O). Additionally, in the apparatus according to the invention, the scale servo control circuit 28 is designed to be responsive to an external input data produced by the computer (not shown) so as to externally set the relative distance d between the objective lens 5 and the measured surface 6 at a desired distance or to externally set a displacement of the objective lens 5. In this case, an undesirable collision contact between the objective lens 5 and the measured surface 6 is avoided before the fact. The focused position of the objective lens 5 is externally searchable.

Furthermore, since the feedback control mode is shifted from the scale servo control mode to the focus servo control mode only when the two necessary conditions are both satisfied, a transit from the scale servo control mode to the focus servo control mode can be certainly executed. Additionally, since the sole actuator 16 is used commonly to both the scale servo control and the focus servo control, the entire size of the displacement measurement apparatus may be small-sized, and the total cost of the apparatus may be reduced to a minimum.

Moreover, even when the objective lens 5 unpredictively moves closer to the measured surface 6, the objective lens 5 can be moved away from the measured surface 6 through the previously-noted additional emergency scale servo control and whereby an accidental collision contact between the objective lens 5 and the measured surface 6 can be avoided.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A displacement measurement apparatus utilizing an astigmatism, comprising:

an objective lens focusing a laser beam on a measured surface;

an optical system detecting an offset distance between a relative distance of said objective lens to said measured surface and a focal distance of said lens by utilizing a reflection beam reflected from said measured surface, to generate a focus-error signal indicative of said offset distance;

an actuator integrally connected to said objective lens for moving said objective lens in a direction of an optical axis of said lens on the basis of said focus-error signal, so that said relative distance is maintained at said focal distance;

a linear scale and a detecting head cooperative with each other, for detecting a displacement of said linear scale to said head; one of said linear scale and said head being integrally connected to said actuator for moving together with said lens and coaxially aligned with said optical axis, and the other being stationary; said head generating a linear-scale displacement signal indicative of said displacement of said linear scale;

a first servo control circuit arranged for executing a first feedback control based on said linear-scale displacement signal so that said linear-scale displacement signal is adjusted to zero;

a second servo control circuit arranged for executing a second feedback control based on said focus-error signal so that said focus-error signal is adjusted to zero; and a zone decision circuit connected to said first and second servo control circuits, for selecting said first feedback control among the two feedback controls when a signal level of said focus-error signal is shifted to a dead zone in which said focus-error signal is unusable as a servo signal necessary for said second feedback control.

2. The displacement measurement apparatus as claimed in claim 1, wherein said optical system comprises a four-split photo diode consisting of two opposing pairs of light receiving segments, each sensitive to said reflection beam to generate a voltage signal, and when receiving said reflection beam, said four-split diode generating a RF signal as well as said focus-error signal being defined by a difference between a sum of two voltage signals produced by the one opposing pair of light receiving segments and a sum of two voltage signals produced by the other opposing pair of light receiving segments, and said RF signal being defined by a sum of four voltage signals respectively produced by the two opposing pairs of light receiving segments.

3. The displacement measurement apparatus as claimed in claim 2, wherein said zone decision circuit determines that the signal level of said focus-error signal is conditioned within said dead zone when said RF signal is less than a predetermined threshold, and determines that the signal level of said focus-error signal is conditioned within a focus-error signal dependent servo control permissible zone in which said focus-error signal is usable as said servo signal when said RF signal is above said predetermined threshold, and said zone decision circuit selecting said second feedback control among the two feedback controls when the signal level of said RF signal is above said predetermined threshold and the signal level of said focus-error signal reaches to zero.

4. The displacement measurement apparatus as claimed in claim 3, wherein said first servo control circuit is responsive to an external input data as well as to said linear-scale data signal, for externally setting a displacement of said objective lens.

5. The displacement measurement apparatus as claimed in claim 3, wherein said first servo control circuit drivingly controls said actuator at a high speed when the signal level of said focus-error signal is conditioned within said dead zone, and at a low speed when the signal level of said focus-error signal is conditioned within said focus-error signal dependent servo control permissible zone.

6. The displacement measurement apparatus as claimed in claim 1, wherein said zone decision circuit generates an emergency signal to said first servo control circuit for moving said objective lens away from said measured surface when said objective lens lies in proximity to said measured surface and said linear-scale data signal exceeds a predetermined threshold.

* * * * *